United States Patent [19]
Sherman

[11] 4,110,983
[45] Sep. 5, 1978

[54] AIR OPERATED HYDRAULIC PUMP APPARATUS

[75] Inventor: Clarence A. Sherman, Birmingham, Mich.

[73] Assignee: Terry McDermid, Southfield, Mich.

[21] Appl. No.: 805,680

[22] Filed: Jun. 13, 1977

[51] Int. Cl.$^2$ .................... F16D 31/02; F15B 13/09
[52] U.S. Cl. .................. 60/477; 60/DIG. 10; 180/89.18
[58] Field of Search ......... 60/403, 477, 486, DIG. 10; 180/89.17, 89.18; 296/28 C

[56] References Cited

U.S. PATENT DOCUMENTS

| | | | |
|---|---|---|---|
| 2,439,796 | 4/1948 | Dearsley | 60/477 X |
| 2,573,993 | 11/1951 | Sedgwick | 60/477 |
| 4,026,113 | 5/1977 | Sherman | 60/477 |

*Primary Examiner*—Edgar W. Geoghegan
*Attorney, Agent, or Firm*—Reising, Ethington, Barnard, Perry & Brooks

[57] ABSTRACT

Air operated hydraulic pump apparatus disclosed is particularly adaptable for use with tilting cab control systems. Reciprocation of a pump plunger to pump control liquid from a reservoir is achieved by a spring biased piston slidable within a cylinder bore and alternately moved in opposite directions by the spring bias and compressed air. A valve of the apparatus has a first position where it supplies compressed air to a first chamber of the cylinder bore so as to act against the spring bias and move the piston in one direction. The spring providing the bias is received within a second chamber of the cylinder bore and moves the piston in the opposite direction when the valve is moved to a second position that terminates the supply of compressed air to the first chamber and exhausts the first chamber to the environment. After movement of the piston for a predetermined extent against the bias of the spring, a first actuator moves the valve from the first position thereof to the second position and then allows the spring to act and return the piston. A second actuator on the piston engages the valve upon the return piston movement and moves the valve from the second position back to the first position so that the first chamber is again isolated from the environment and subsequently fed compressed air that begins another cycle. A manual pump is used in addition to the air operated pump and both pumps feed a control valve for directing the flow of pumped liquid from the reservoir.

10 Claims, 2 Drawing Figures

AIR OPERATED HYDRAULIC PUMP APPARATUS

BACKGROUND OF THE INVENTION

1. Field of the Invention

This invention relates to compressed air operated hydraulic pump apparatus particularly adapted for use with tilting cab control systems to pump hydraulic fluid that moves a tilting cab of a vehicle between lower use and upper access positions.

2. Description of the Prior Art

Vehicle tilting cab control apparatus conventionally includes a hydraulic pump that feeds hydraulic fluid to an extendable cylinder whose extension raises a passenger cab in a tilting fashion from a lower use position to an upper access position where access to the associated vehicle engine for repair or maintenance is permitted. With one type of such a cab vehicle, the extendable cylinder is "single acting" and is supplied pumped hydraulic fluid only to extend its length. Release of the hydraulic fluid with this type of cab permits the cylinder to retract under the force of gravity acting on the cab in a downward direction to move it to its lower use position. Another type of tilting cab vehicle incorporates a "double acting" cylinder that is supplied pumped hydraulic fluid to extend and retract the cylinder in a manner that drives the cab in both directions between its access and use positions.

Manual and hydraulic pumps have previously been utilized to supply pumped hydraulic fluid from a reservoir to the cylinder which moves the cab. Such air operated pumps conventionally include a piston slidably received within a cylinder and alternately moved in opposite directions by a spring and a continuous supply of compressed air. The compressed air is continuously supplied to a first chamber to move the piston against the bias of the spring which is normally positioned in a second chamber on the opposite side of the piston. After the piston has moved a certain amount against the spring bias, the first chamber is exhausted to the environment while the compressed air is continually fed to it. However, the area permitting exhaustion is greater than the area through which the compressed air is supplied so that the net effect is that the spring can move the piston in the opposite direction for a predetermined extent until the exhaustion area is closed. Subsequently, the piston moves in the opposite direction as the pressure again builds up in the first chamber so that the piston is reciprocated. Compressed air thus continually flows to the cylinder in which the piston reciprocates to provide reciprocal motion of a pump plunger that pumps the hydraulic fluid.

SUMMARY OF THE INVENTION

An object of the present invention is to provide improved hydraulic pump apparatus which is particularly adaptable for use with tilting cab control systems and which includes a hydraulic pump that is reciprocally driven by a piston that is moved in opposite directions by a spring and a supply of compressed air under the control of a valve whose operation terminates the supply of compressed air during piston movement under the impetus of the spring.

In carrying out the above object, a preferred embodiment of the pump apparatus includes a liquid reservoir that receives the hydraulic pump driven by the reciprocal piston. A manual pump and the air operated hydraulic pump are independently operable to feed pumped hydraulic liquid to a selector valve that directs the flow of pumped liquid to a drive cylinder for extending or retracting the cylinder to raise or lower the associated tilting cab. Reciprocal movement of the piston takes place within a cylinder bore in a housing supported on the liquid reservoir. A first chamber defined in the cylinder bore on one side of the piston receives the supply of compressed air to move the piston toward a second chamber on the other side of the piston against the bias of the spring which is preferably located within the second chamber. The valve which controls the compressed air fed to the first chamber has a first position that feeds the air to this chamber to allow the piston movement against the spring bias. In response to a predetermined extent of piston movement against the spring bias, a first actuator moves the valve from the first position to a second position where the supply of compressed air is terminated and the first chamber is exhausted to the environment so that the spring can then return the piston in the opposite direction to complete one cycle of reciprocal piston movement. After the piston has moved a predetermined extent under the impetus of the spring, a second actuator moves the valve from the second position back to the first position so a new cycle can begin. Reciprocation of the piston reciprocates a plunger of the air operated hydraulic pump to pump the liquid from the reservoir to the selector valve.

Compressed air provides the impetus for the first actuator that moves the valve from the first position to the second position after the predetermined extent of piston movement against the bias of the spring. A valve element of the valve has an intermediate valve passage that is located in the first position of the valve to supply the compressed air to the first chamber. A piston head connected to the valve element is part of the first actuator and is slidably received in a sealed relationship within a piston head bore of the housing. A control tube is slidably received within a hole in the piston and communicates with one side of the piston head within the piston head bore. When the piston has moved within the cylinder bore a predetermined extent against the bias of the spring, an end of the control tube is communicated with the first chamber of the cylinder bore to feed the compressed air to the piston head and provide movement thereof that moves the valve element from the first position to the second position of the valve. As this valve movement takes place, the intermediate valve passage terminates the supply of compressed air to the first chamber of the cylinder bore and a valve head on the valve element opens an exhaust passage to the first chamber so that the spring can return the piston in the opposite direction. At its central portion about the hole that receives the control tube, the piston has a protrusion into the first chamber that forms the second actuator for moving the valve element from the second position back to the first position after the piston has been moved a predetermined extent by the spring. Engagement of the protrusion and the valve element takes place at the valve head which closes the exhaust passage. Another exhaust passage continually communicates the environment with the side of the piston head opposite the one which is fed compressed air by the control tube of the first actuator. Compressed air is exhausted to the environment only during one half of each piston cycle and good pumping performance can be achieved with a limited head of compressed air.

In its disclosed embodiment, the reciprocal piston includes an annular sleeve portion and a disc portion that closes one end of the sleeve portion to define a cup shape. A projection extends from the disc portion in the opposite direction as the protrusion of the second actuator and defines the hole that slidably receives the control tube of the first actuator. A spring fitting of a cup shape receives the piston projection and has an annular flange seated against the disc portion of the piston. The biasing spring is of the helical type and receives the fitting so that one of its ends is seated against the annular flange. The fitting has an end with an opening through which the pump plunger of the air operated pump extends into the reservoir.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
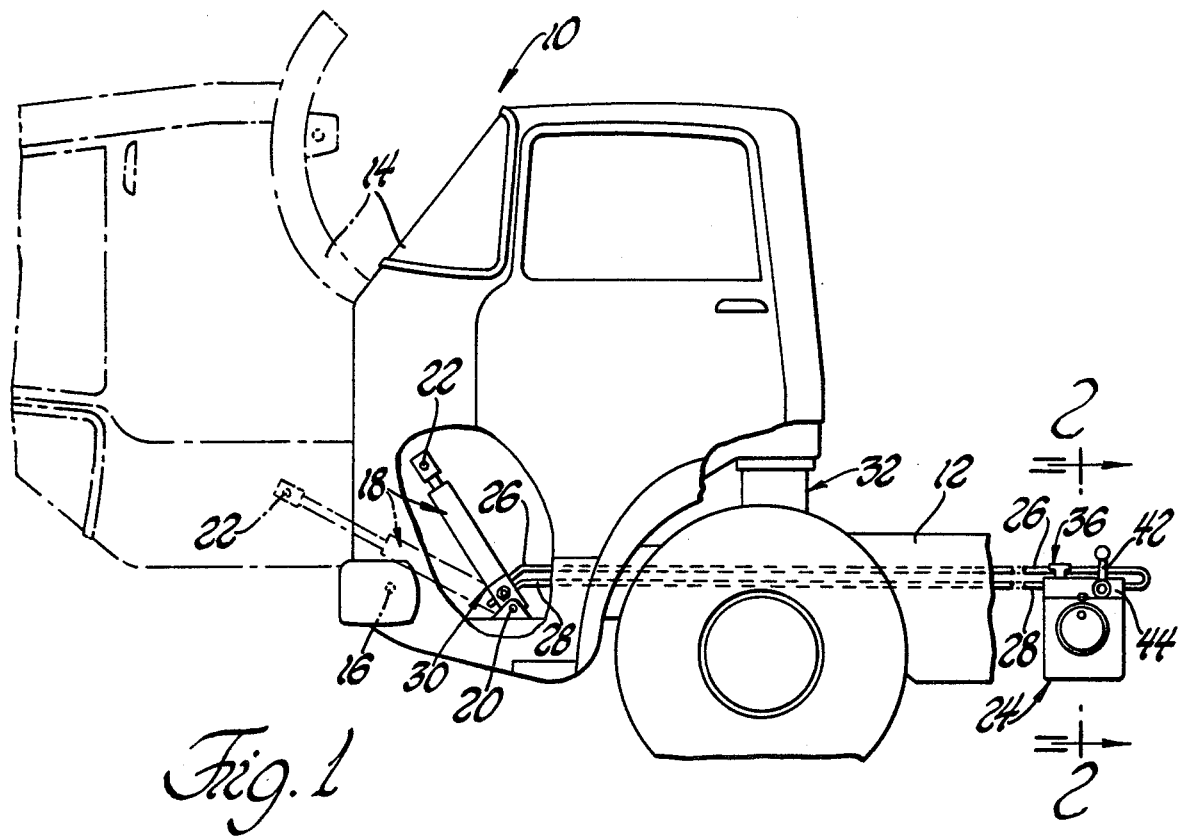
FIG. 1 is a side elevation view of a tilting cab vehicle incorporating hydraulic pump apparatus constructed according to the present invention.

With reference to FIG. 1 of the drawings, a vehicle indicated collectively by 10 includes a frame 12 and a tilting passenger cab 14 that is movable on the frame about a transverse pintle 16 between the lower use position shown by solid lines and the upper access position shown by phantom lines. In the upper access position of the cab, the associated vehicle engine (not shown) is accessible for repair and maintenance. A "double acting" hydraulic cylinder 18 has one end 20 connected to the frame 12 and another end 22 connected to the cab 14 such that cylinder retraction and extension drive the cab between the two positions shown. Control liquid is pumped from pump apparatus 24 according to this invention through conduits 26 and 28 that feed a lock valve 30 of the cylinder 18. Liquid pumped through conduit 26 drives the cylinder 18 from its retracted position to its extended position in order to raise the cab 14 from its lower use position to its upper access position. Liquid pumped through the conduit 28 drives the cylinder from its extended position to its retracted position in order to drive the cab from its access position to its lower use position. Lock valve 30 is preferably of the type shown and described in co-pending U.S. patent application Ser. No. 743,269, filed Nov. 19, 1976, now U.S. Pat. No. 4,081,053 granted Mar. 28, 1978 the entire disclosure of which is hereby incorporated by reference. As the cab is driven to its lower use position, a latch mechanism 32 is operable to retain the cab against upward movement. This latch mechanism preferably is of the type shown and described in co-pending U.S. patent application Ser. No. 691,278, filed June 1, 1976, the entire disclosure of which is hereby incorporated by reference.

Figure 2:
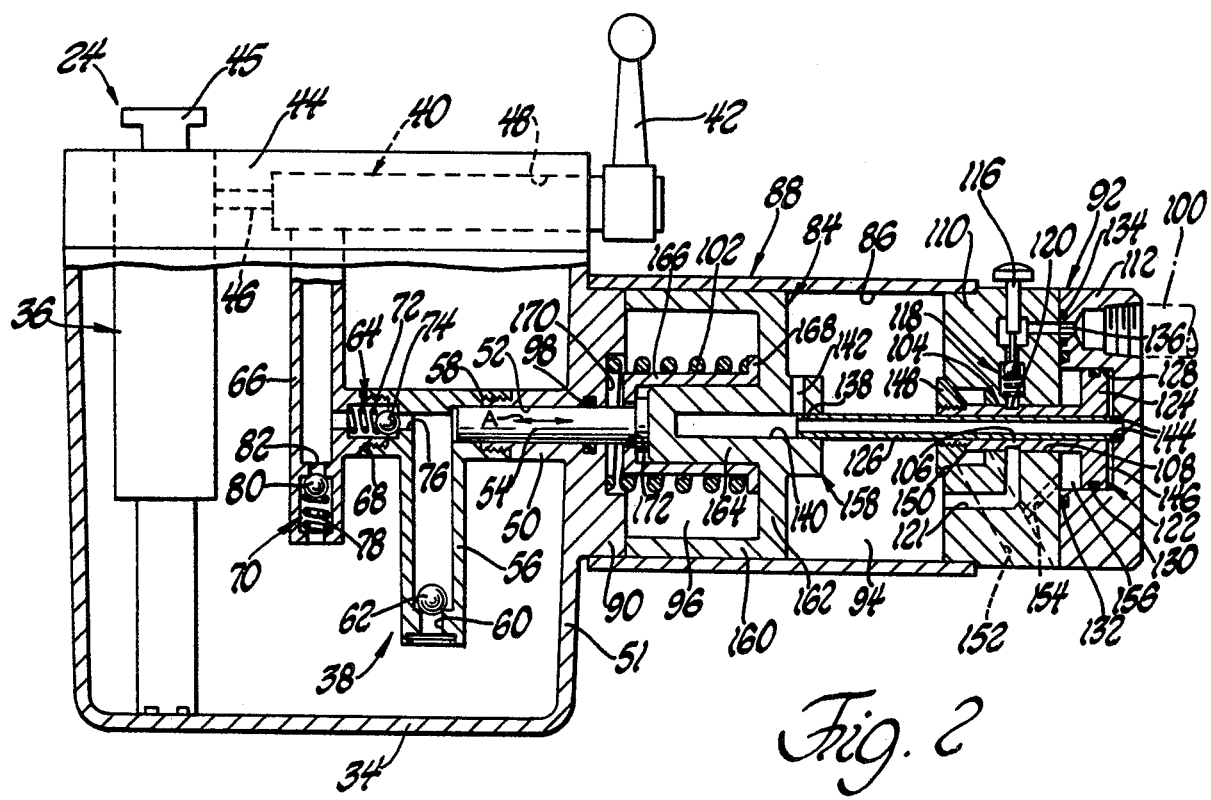
FIG. 2 is a partially sectioned view of the pump apparatus taken along line 2—2 of FIG. 1.

With additional reference to FIG. 2, pump apparatus 24 includes a liquid reservoir 34 from which hydraulic fluid or liquid is pumped to the drive cylinder 18 through one or the other of conduits 26 or 28 and to which the liquid is returned through the other conduit as the pumping takes place. A manual pump 36 or an air operated pump 38 are independently operable to feed pumped hydraulic fluid to a selector valve indicated schematically at 40. Positioning of a handle 42 of valve 40 selectively feeds the pumped fluid to either the conduit 26 or the conduit 28 to raise or lower the cab. Manual pump 36 extends downwardly through a cover plate 44 that closes the upper side of the liquid reservoir. Upward and downward movement of a manual pump handle 45 feeds the pumped fluid through a passage 46 in the cover plate to the selector valve 40 which extends inwardly through a bore 48 from one side edge of the cover plate. Passage 46 includes a check valve, not shown, that permits fluid flow therethrough from the left to the right but not in a reverse direction. Manual pump 36 and selector valve 40 as well as the construction of each in cooperation with the cover plate 44 are of a construction disclosed by U.S. Pat. No. 4,026,113, issued May 31, 1977, the entire disclosure of which is hereby incorporated by reference.

Air operated pump 38 shown in FIG. 2 feeds pumped liquid to the selector valve 40 at a common fluid juncture with the passage 46 of the manual pump 36 so that each pump can be operated independently of the other to provide the pumped liquid to the valve. An inward projection 50 of pump 38 is integrally formed on a side wall of the liquid reservoir 34 and has a bore 52 slidably receiving a plunger 54 of the pump. Reciprocal plunger movement in the direction shown by arrow A provides the pumping action of the pump. A T-shaped pump tube 56 has an upper end secured to the pump projection 50 by a threaded connection 58 and has a lower end defining a restricted opening 60 that seats a ball 62 for providing a check valve action under the bias of gravity. Movement of plunger 54 to the right, as will be hereinafter described, draws liquid upwardly through the opening 60 as the ball 62 moves upwardly to permit filling of the pump tube 56 and filling of the left portion of the bore 52 in the projection 50. Subsequent movement of the plunger 54 to the left forces a portion of the liquid above the ball 62 to the left through a check valve 64 and into a tube 66 that is connected to the upper end of tube 56 by a threaded connection 68. An upper end of tube 66 feeds the selector valve 40 while a lower end of this tube has a relief valve 70 that permits the pump 38 from supplying excessively pressurized fluid that could rupture a conduit and cause leakage. Thus, the bias of spring 72 on ball 74 of check valve 64 in relationship to the side of the check valve opening 76 is much smaller than that of the spring 78 on the ball 80 of relief valve 70 in relationship to the size of its opening 82.

Reciprocal movement of the pump plunger 54 as shown by arrow A is provided by a piston 84 that slides in a sealed relationship within a round cylinder bore 86 in a housing 88. One end of housing 88 fits over an integral lug 90 of the liquid reservoir side wall 51. The other end of housing 88 is closed by a housing end cap 92. Piston 84 divides the cylinder bore 86 into a first chamber 94 on the right side of the piston and a second chamber 96 on the left side of the piston. Pump plunger 54 has an end connected to the left side of piston 84 so that reciprocation of the piston provides reciprocal movement of the plunger. A seal 98 provides a sealed relationship between the second chamber 96 of the piston cylinder bore and the left portion of the pump plunger bore 52 in which the liquid is pumped. Compressed air is fed from a supply line 100 through the housing end cap 92, in a manner that is hereinafter described, to pressurize the first chamber 94 and move the piston 84 to the left against the bias of a spring 102.

Subsequently, termination of the supply of compressed air to the first chamber 94 and exhaustion thereof to the environment allows the spring 102 to return the piston 84 to the right ready for another cycle such that repeated movement of the piston in this reciprocal manner reciprocates the pump plunger 54 to provide pumping of the liquid.

A control valve 104 is located within the housing end cap 92 and includes a valve element 106 that slides within a valve bore 108 extending through a first round plate 110 of the end cap 92. A second round plate 112 of the end cap is located to the right of plate 110 and is secured thereto as well as to the housing 88 by unshown bolts that also retain the attachment of the left end of the housing to the liquid reservoir 34. Slidable movement of the valve element 106 within the bore 108 of the first plate 110 controls the flow of compressed air from the line 100 to the first cylinder chamber 94. Upon depression of an actuator plunger 116, a valve 118 is opened to permit the compressed air to flow through an intermediate passage 120 of an annular shape in the valve element 106 and hence through an L-shaped passage 121 in the end-cap into the cylinder bore 94. This flow of compressed air takes place due to the positioning of the valve element as shown in a first position that represents the right-hand extent of the valve element movement. Pressurization of the chamber 94 moves the piston 84 from the right toward the left to the position shown against the bias of spring 102. This piston movement moves the pump plunger 54 to the left to force liquid through the check valve 64 and upwardly through the pump tube 66 into the selector valve 40.

A first actuator 122 for valve 104 includes a piston head 124 connected to the right end of valve element 106 and a control tube 126 that extends through the valve element to the piston 84. Piston head 124 slides within a piston head bore 128 in the second round plate 112 of the housing end cap 92. A seal 130 of the piston head seals with the bore 128 and a seal 132 surrounds this bore to seal between the plates 110 and 112. Likewise, a seal 134 surrounds the passage 136 in the plates 110 and 112 through which the compressed air is fed from the line 100 to the valve 118. As the air is supplied from the line 100 through the valve 104 to move the piston 84 to the left, the left end 138 of stationary control tube 126 is pulled out from a hole 140 that opens to the right side of the piston. Upon the piston 84 reaching its farthest position of travel to the left as shown, a passage 142 in the piston communicates the left end 138 of tube 126 with the pressurized first chamber 94. This communication feeds compressed air through the control tube 126 and through holes 144 in the right end of the tube to the right side of the piston head 124. The piston head bore chamber 146 on the right of piston head 124 is then pressurized to slide the piston head to the left so that the valve element 106 is moved to a second position where its annular chamber is located to the left of the outlet from valve 118 and to the left of the upper leg of passage 121 so that the supply of compressed air to chamber 94 is terminated. A frustoconical valve head 148 threaded on the left end of valve element 106 moves out of engagement with a valve seat 150 as the valve element is moved to the left. This valve seat surrounds the inner end of an exhaust passage 152 through the end cap plate 110 and exhausts the chamber 94 to permit spring 102 to return piston 84 to the right. It should also be noted that a chamber 156 defined within piston head bore 128 on the left of piston head 124 is continually communicated by an exhaust passage 154 and the outer end of exhaust passage 152 with the environment so that it is at atmospheric pressure and thereby allows the movement of the piston head to the left.

Upon the initial movement of piston 84 to the right under the bias of spring 102, the interior of tube 126 is isolated from the chamber 94 as the passage 142 moves to the right of the left tube end 138. Hole 140 into which the control tube is inserted is centrally located within a protrusion that extends toward the right into the chamber 94 and functions as a second actuator 158. Engagement of the piston actuator 158 with the valve head 148 upon continued movement of the piston 84 to the right moves the valve element 106 from its second position back to its first position so that the valve head engages the valve seat 150 and again communicates the output from the valve 118 with the passage 121 that feeds chamber 94. Another cycle of the piston reciprocation then begins as the chamber 94 is pressurized to again move the piston to the left. During each cycle of piston reciprocation, the supply of compressed air is exhausted to the environment only during one-half of the cycle and very good pumping action can thus be achieved with a relatively low head of air pressure. Pumping takes place as long as plunger 116 remains depressed.

Piston 84 in its preferred form includes an annular sleeve portion 160 and a disc portion 162 that closes the right end of the sleeve portion so that the piston has a somewhat cup shape. At the center of the piston, a projection 164 extends within the sleeve portion 160 in the opposite direction as the protrusion of actuator 158 so as to define the rest of hole 140 which receives the control tube 126. A spring fitting 166 receives the piston projection 164 and has an annular end flange 168 that seats against the piston disc portion 162. Spring 102 that biases piston 84 is of the helical type and has one end seated against the spring fitting end flange 168 and a second end received within a shallow opening 170 in the reservoir side wall lug 90. An end of the spring fitting opposite the end flange 162 defines an opening 172 through which an end of the plunger 54 extends for connection to the piston projection in any suitable manner such as by a threaded joint.

While a preferred embodiment of the pump apparatus according to the present invention has herein been described in detail, those skilled in the art will recognize various alternative designs and embodiments for practicing the present invention as defined by the following claims.

What is claimed is:

1. Hydraulic pump apparatus comprising: a housing defining a cylinder bore; a hydraulic pump actuating piston sealingly slidable within the bore to define first and second chambers whose sizes change during piston movement; spring means for biasing the piston in a direction toward the first chamber from the second chamber; a valve having a first position for feeding compressed gas to the first chamber to move the piston against the bias of the spring means; said valve being movable to a second position to terminate the supply of compressed gas to the first chamber and concomitantly communicate the first chamber to the environment to permit the bias of the spring means to move the piston; a first actuator for moving the valve from the first position to the second position upon a predetermined extent of piston movement against the spring means; and a second actuator for moving the valve from the second position back to the first position upon a predetermined extent of piston movement under the bias of the spring means, whereby the piston reciprocates within the bore as the valve is moved between the first and second positions in response to piston reciprocation.

2. Hydraulic pump apparatus comprising: a housing defining a cylinder bore; a piston sealingly slidable within the bore to define first and second chambers whose sizes change during piston movement; a hydraulic pump having a plunger moved by the piston; a spring received within the second chamber of the housing to bias the piston in a direction toward the first chamber; a valve having a first position for feeding compressed air to the first chamber so as to move the piston against the bias of the spring; said valve being movable to a second position to terminate the supply of compressed air to the first chamber and concomitantly communicate the first chamber to the environment to permit the bias of the spring to move the piston; a first valve actuator that moves the valve by air pressure from the first position to the second position upon a predetermined extent of piston movement against the bias of the spring; and a second actuator carried by the piston so as to engage and move the valve from the second position back to the first position upon a predetermined extent of piston movement under the bias of the spring, whereby the piston reciprocates within the bore as the valve is alternately moved between the first and second positions.

3. Hydraulic pump apparatus for a tilting cab control system comprising: a liquid reservoir; a compressed air operated pump having a reciprocable plunger for pumping liquid from the reservoir; a manual pump for pumping liquid from the reservoir independently of the air operated pump; a housing defining a cylinder bore; a piston sealingly slidable within the bore to define first and second chambers; said pump plunger having an end connected to the piston within the second chamber such that piston movement within the bore reciprocates the plunger; a spring for biasing the piston in a direction toward the first chamber from the second chamber; a valve having a first position for feeding compressed air to the first chamber to move the piston against the bias of the spring; said valve being movable to a second position to terminate the supply of compressed air to the first chamber and concomitantly communicate the first chamber to the environment to permit the bias of the spring to move the piston; a first valve actuator having a piston head that moves the valve by air pressure from the first position to the second position upon a predetermined extent of piston movement against the bias of the spring; and a second actuator on the piston for engaging and moving the valve from the second position back to the first position upon a predetermined extent of piston movement under the bias of the spring, whereby the piston reciprocates within the bore to reciprocate the plunger and pump liquid from the reservoir.

4. Hydraulic pump apparatus for a tilting cab control system comprising: a housing defining a cylinder bore; a piston sealingly slidable within the bore to define first and second chambers whose sizes change during piston movement; an axial hole in the piston that opens toward the first chamber; a hydraulic pump having a plunger connected to the piston within the second chamber so as to be reciprocated by reciprocation of the piston within the bore; a spring within the second chamber for biasing the piston in a direction toward the first chamber; a valve including a valve element positionable in a first position for feeding compressed air to the first chamber and having a valve head received within the first chamber; the housing having an exhaust passage closed by the valve head in the first position of the valve element so that the compressed air fed to the first chamber moves the piston against the bias of the spring; the valve element having a second position where the supply of compressed air to the first chamber is terminated and where the valve head opens the exhaust passage to permit the bias of the spring to move the piston; a first actuator including a piston head connected to the valve element and a head bore in the housing that slidably receives the piston head in a sealed relationship so as to define first and second chambers thereof; a housing passage that communicates the first chamber of the head bore with the environment; said first actuator also including a control tube that is slidably received within the axial hole in the piston within the cylinder bore and which communicates with the second chamber of the piston head bore; said control tube having an end that communicates the first chamber of the cylinder bore with the second chamber of the piston head bore upon a predetermined extent of movement of the piston within the cylinder bore against the bias of the spring so that compressed air moves the piston head to move the valve element from the first position to the second position and thereby allows the spring to move the piston within the cylinder bore; and a second actuator on the piston for engaging the valve head of the valve element upon a predetermined extent of piston movement under the bias of the spring to move the valve element from the second position to the first position, whereby the piston is reciprocated within the cylinder bore as the valve element is alternately moved between the first and second positions.

5. Hydraulic pump apparatus for a tilting cab control system comprising: a liquid reservoir; a housing supported by the reservoir and defining a cylinder bore; a piston sealingly slidable within the bore to define first and second chambers whose sizes change during piston movement; an axial hole in the piston that opens toward the first chamber; a hydraulic pump received within the reservoir and having a plunger connected to the piston within the second chamber so as to be reciprocated by reciprocation of the piston within the bore; a spring within the second chamber for biasing the piston in a direction toward the first chamber; a valve including a valve bore within the housing and a valve element received within the valve bore; the valve element having an intermediate valve passage and being positionable in a first position so that the valve passage feeds compressed air to the first chamber; the valve element also having a valve head; the housing having an exhaust passage closed by the valve head in the first position of the valve element so that the compressed air fed to the first chamber moves the piston against the bias of the spring; the valve element having a second position where the intermediate valve passage is positioned within the valve bore to terminate the supply of compressed air to the first chamber and where the valve head opens the exhaust passage to permit the bias of the spring to move the piston; a first actuator including a piston head connected to the valve element and a head bore in the housing that slidably receives the piston head in a sealed relationship so as to define first and second chambers thereof; an exhaust passage that communicates the first chamber of the head bore with the environment; said first actuator also including a control tube that is slidably received within the axial hole in the piston within the cylinder bore and which communicates through the valve element with the second chamber of the piston head bore; said control tube having an end that communicates the first chamber of the cylinder bore with the second chamber of the piston head bore upon a predetermined extent of movement of the piston within the cylinder bore against the bias of the spring so that compressed air moves the piston head to move the valve element from the first position to the second position and thereby allows the spring to move the piston within the cylinder bore; and a second actuator on the piston for engaging the valve head of the valve element upon a predetermined extent of piston movement under the bias of the spring to move the valve element from the second position to the first position, whereby the piston is reciprocated within the cylinder bore as the valve element is alternately moved between the first and second positions.

6. Hydraulic pump apparatus for a tilting cab control system comprising: a liquid reservoir; a compressed air operated pump for pumping liquid from the reservoir; a manual pump for pumping liquid from the reservoir independently of the air operated pump; a housing supported by the reservoir and defining a cylinder bore; a piston sealingly slidable within the bore to define first and second chambers whose sizes change during the piston movement; an axial hole in the piston that opens toward the first chamber; said air operated pump having a plunger connected to the piston within the second chamber so as to be reciprocated by reciprocation of the piston within the bore; a spring within the second chamber for biasing the piston in a direction toward the first chamber; a valve including a valve bore within the housing and a valve element received within the valve bore; the valve element having an intermediate valve passage and being positionable in a first position so that the valve passage feeds compressed air to the first chamber; the valve element also having a valve head; the housing having an exhaust passage closed by the valve head in the first position of the valve element so that the compressed air fed to the first chamber moves the piston against the bias of the spring; the valve element having a second position where the intermediate valve passage is positioned within the valve bore to terminate the supply of compressed air to the first chamber and where the valve head opens the exhaust passage to permit the bias of the spring to move the piston; a first actuator including a piston head connected to the valve element and a head bore in the housing that slidably receives the piston head in a sealed relationship so as to define first and second chambers thereof; an exhaust passage that communicates the first chamber of the head bore with the environment; said first actuator also including a control tube that is slidably received within the axial hole in the piston within the cylinder bore and which communicates through the valve element with the second chamber of the piston head bore; said control tube having an end that communicates the first chamber of the cylinder bore with the second chamber of the piston head bore upon a predetermined extent of movement of the piston within the cylinder bore against the bias of the spring so that compressed air moves the piston head to move the valve element from the first position to the second position and thereby allows the spring to move the piston within the cylinder bore; and a second actuator on the piston for engaging the valve head of the valve element upon a predetermined extent of piston movement under the bias of the spring to move the valve element from the second position to the first position, whereby the piston is reciprocated within the cylinder bore as the valve element is alternately moved between the first and second positions.

7. Apparatus as in claim 6 wherein the piston includes an annular sleeve portion, a disc portion that closes one end of the sleeve portion to define a cup shape; and a projection that extends from the disc portion within the sleeve portion to define the hole that slidably receives the control tube.

8. Apparatus as in claim 7 further including a spring fitting of a cup shape that receives the projection, an annular flange on the fitting seated against the disc portion of the piston, said biasing spring being of the helical type with one end seated by the annular flange of the fitting, and the fitting having an end with an opening through which the pump plunger projects.

9. Apparatus as in claim 7 wherein the second actuator includes a central protrusion that extends from the disc portion of the piston in the opposite direction as the projection, the protrusion having a central portion defining the hole that receives the control tube.

10. Apparatus as in claim 6 further including a selector valve fed by both the manual and air operated pumps.

* * * * *